United States Patent
Chung et al.

(10) Patent No.: US 11,086,825 B2
(45) Date of Patent: *Aug. 10, 2021

(54) TELEMETRY SYSTEM FOR A CLOUD SYNCHRONIZATION SYSTEM

(71) Applicant: Microsoft Technology Licensing, LLC, Redmond, WA (US)

(72) Inventors: Richard Chung, Kirkland, WA (US); Roger Lueder, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,575

(22) Filed: Aug. 24, 2018

(65) Prior Publication Data
US 2018/0365264 A1    Dec. 20, 2018

Related U.S. Application Data

(63) Continuation of application No. 13/439,859, filed on Apr. 5, 2012, now Pat. No. 10,089,323.

(51) Int. Cl.
*G06F 11/16* (2006.01)
*G06F 16/178* (2019.01)
*G06F 11/20* (2006.01)

(52) U.S. Cl.
CPC ........ *G06F 16/178* (2019.01); *G06F 11/1662* (2013.01); *G06F 11/2094* (2013.01)

(58) Field of Classification Search
CPC . G06F 16/178; G06F 11/1662; G06F 11/2094
USPC ......................................................... 717/124
See application file for complete search history.

(56) References Cited

U.S. PATENT DOCUMENTS

| 7,134,116 B1* | 11/2006 | Thekkath et al. .. G06F 11/3636 717/124 |
| 2003/0159132 A1* | 8/2003 | Barnett et al. ...... G06F 11/3672 717/124 |
| 2005/0149481 A1* | 7/2005 | Hesselink et al. .. H04L 63/0209 707/999.001 |

(Continued)

FOREIGN PATENT DOCUMENTS

KR    20060083118 A    7/2006

OTHER PUBLICATIONS

"Office Action Issued in Korean Patent Application No. 10-2014-7027949", dated Apr. 2, 2019, 10 Pages.

(Continued)

*Primary Examiner* — Wei Y Zhen
*Assistant Examiner* — Mohammed N Huda
(74) *Attorney, Agent, or Firm* — Alleman Hall Creasman & Tuttle LLP

(57) ABSTRACT

In one embodiment, a telemetry system may track a cloud synchronization system to improve performance. A service proxy 114 may receive a matching file metadata set 304 for a matching file 134 stored in a cloud user account 132 of a cloud synchronization system. The service proxy 114 may execute a synchronization verification of the matching file metadata set 304 to a local file 112 stored in a client device 110. The service proxy 114 may create a telemetry report 400 describing a synchronization error 412 as determined by the synchronization verification.

9 Claims, 8 Drawing Sheets

(56) References Cited

U.S. PATENT DOCUMENTS

| | | | |
|---|---|---|---|
| 2006/0129616 A1* | 6/2006 | Chen | G06F 16/1787 707/204 |
| 2006/0161516 A1 | 7/2006 | Clarke et al. | |
| 2007/0283050 A1* | 12/2007 | Savage | G06F 16/178 709/248 |
| 2009/0157811 A1* | 6/2009 | Bailor et al. | G06F 16/1767 709/204 |
| 2010/0293142 A1* | 11/2010 | Ackerman et al. | H04L 9/3236 707/640 |
| 2011/0320876 A1* | 12/2011 | Klein et al. | G06F 8/33 717/125 |
| 2013/0262862 A1* | 10/2013 | Hartley | G06F 21/602 713/165 |

OTHER PUBLICATIONS

"Office Action Issued in Canadian Patent Application No. 2,866,449", dated Jan. 2, 2019, 3 Pages.
"International Search Report and Written Opinion Issued in PCT Application No. PCT/US2013/035049", dated Apr. 23, 2014, 16 Pages.
"Summons to Attend Oral Proceedings Issued in European Patent Application No. 13717645.9", Mailed Date: Aug. 22, 2019, 6 Pages.
"Office Action Issued in Canadian Patent Application No. 2,866,449", dated Dec. 2, 2019, 5 Pages.
"Office Action Issued in Brazilian Patent Application No. BR112014023106-0", dated Dec. 26, 2019, 6 Pages.
"Summon to Attend Oral Proceedings Issued in European Patent Application No. 13717645.9", Mailed Date: Jan. 20, 2020, 4 Pages.
"Office Action Issued in Indian Patent Application No. 6898/CHENP/2014", dated Feb. 26, 2020, 7 Pages.

* cited by examiner

CLIENT ADDRESS 302 | MATCHING FILE METADATA 304

MATCHING FILE METADATA 304:
| FILE NAME 306 | HIERARCHY 308 | SIZE 310 | FILE HASH 312 | TIMESTAMP 314 |
|---|---|---|---|---|

SERVER ADDRESS 402 | TELEMETRY DATA 404

TELEMETRY DATA 404:
| USER ID 406 | FILE 408 | SW 410 | SYNC ERROR 412 | EVENT TIME 414 | ASSERT 416 | ASSERT LOG 418 | STALL 420 | STALL LOG 422 | SYNC METRIC 424 |
|---|---|---|---|---|---|---|---|---|---|

| USER DEMO 502 | DEVICE PROFILE 504 | TELEMETRY DATA 404 |
|---|---|---|

500
Figure 5

| CLIENT ADDRESS 602 | REVIEW DATA 604 | | | |
|---|---|---|---|---|
| | ERROR PATCH 606 | SERVICE WIDE RECORD 608 | AGGREGATE RECORD 610 | USER RECORD 612 | TIMELINE 614 |

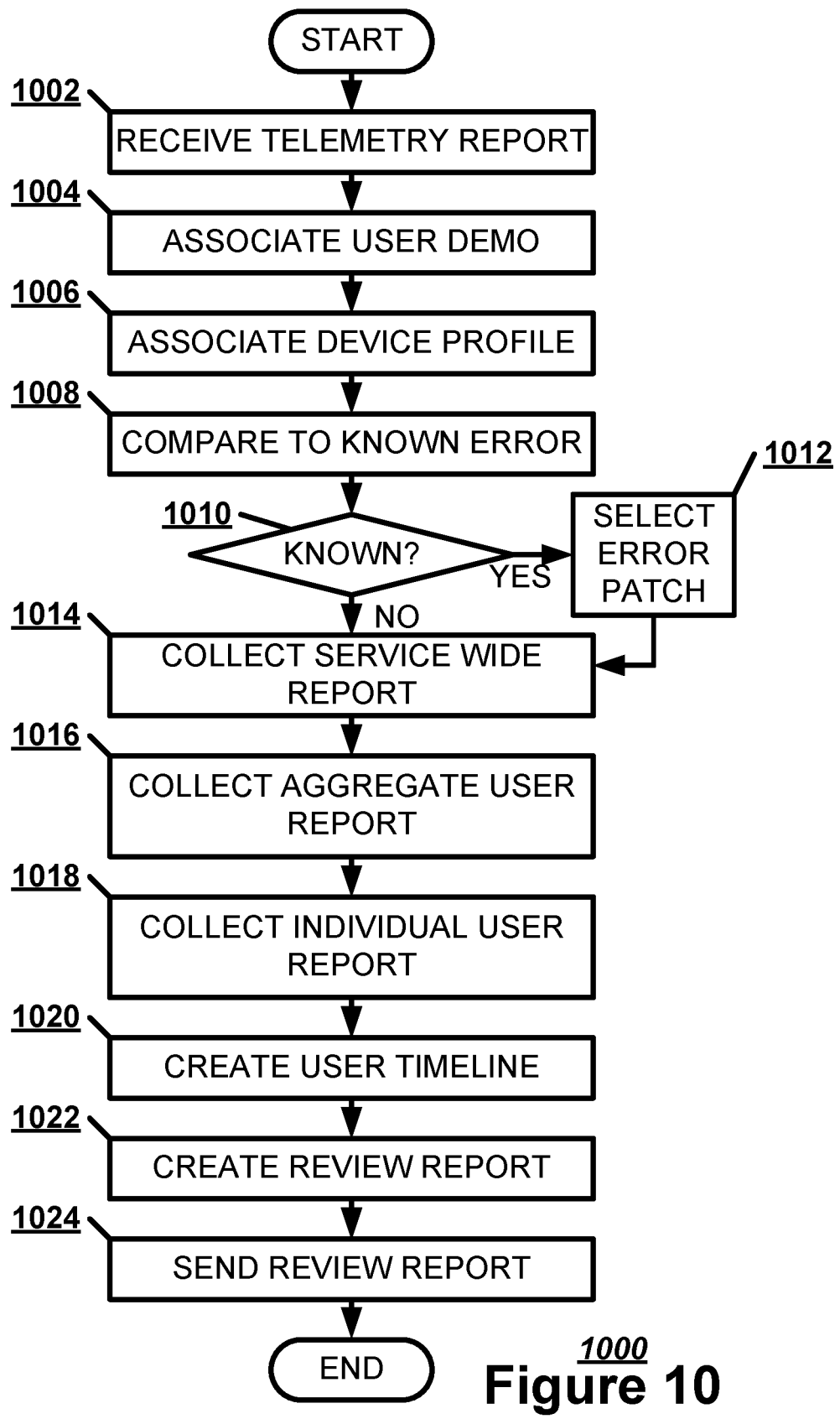

US 11,086,825 B2

TELEMETRY SYSTEM FOR A CLOUD SYNCHRONIZATION SYSTEM

CROSS REFERENCE TO RELATED APPLICATIONS

This application is a continuation of U.S. patent application Ser. No. 13/439,859, filed Apr. 5, 2012, the entire contents of which is hereby incorporated herein by reference for all purposes.

BACKGROUND

A modern computer user may have multiple computer devices, such as a desktop computer, a laptop computer, a tablet computer, or a cellular telephone with computational power, called a "smart phone". A user may keep the files in one device synchronized with files across multiple other devices. A user may transfer any changes to a file in one device to other copies of that file in other devices.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a telemetry system tracking a cloud synchronization system to improve correctness and performance. A service proxy may receive a matching file metadata set for a matching file stored in a cloud user account of a cloud synchronization system. The service proxy may execute a synchronization verification of the matching file metadata set to a local file stored in a client device. The service proxy may create a telemetry report describing a synchronization error as determined by the synchronization verification.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 3 illustrates, in a block diagram, one embodiment of a matching file metadata set message.

FIG. 4 illustrates, in a block diagram, one embodiment of a telemetry report.

FIG. 5 illustrates, in a block diagram, one embodiment of a telemetry record.

FIG. 6 illustrates, in a block diagram, one embodiment of a review report.

FIG. 10 illustrates, in a flowchart, one embodiment of a method of processing a telemetry report in a telemetry server.

DETAILED DESCRIPTION

Figure 1:
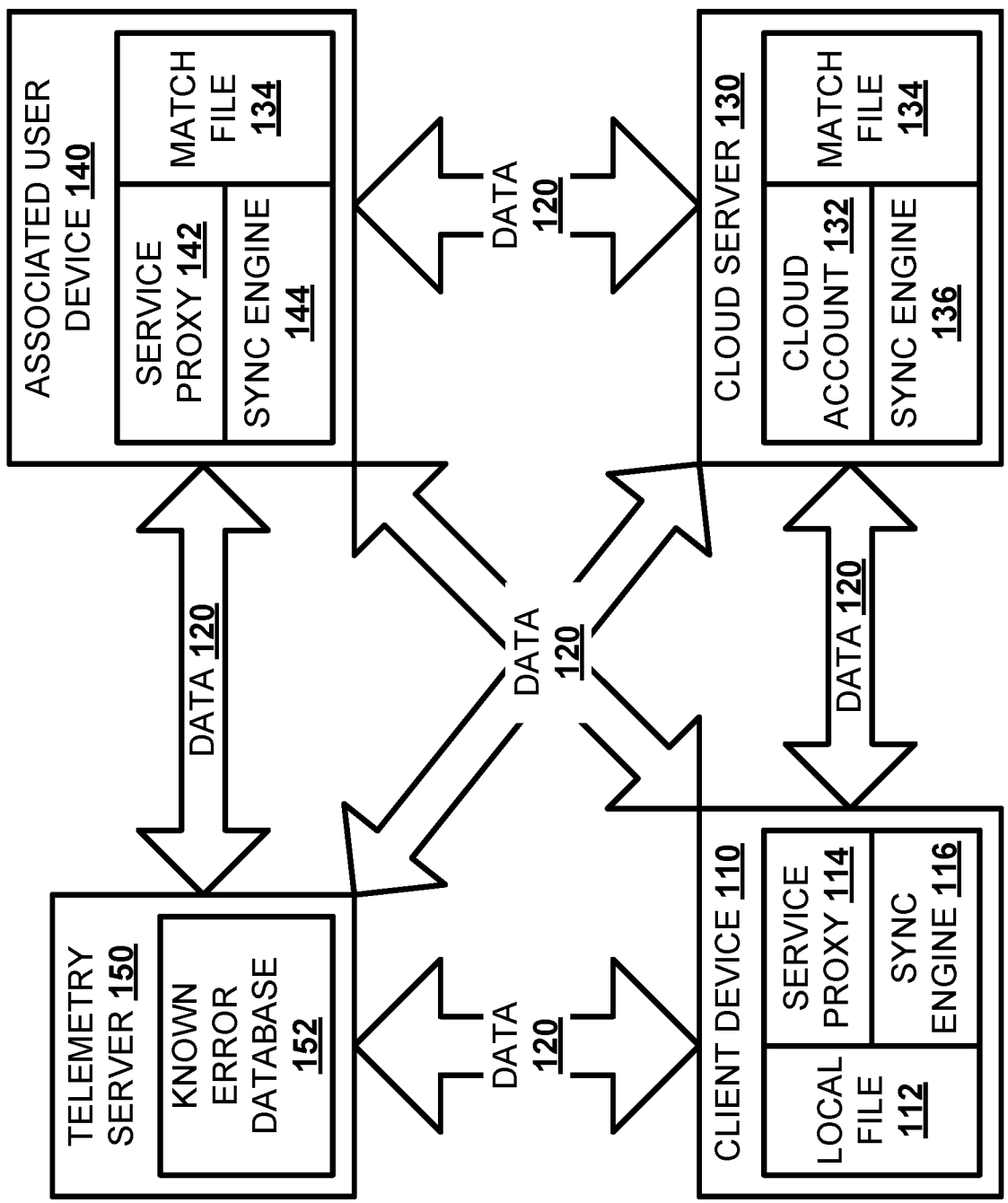
FIG. 1 illustrates, in a block diagram, one embodiment of a cloud synchronization network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a client device.

A user may maintain a copy of a data file on multiple devices, such as a tablet computer, a laptop computer, a desktop computer, and a smartphone. The data file may be a text file, a digital image file, an audio file, a video file, or an executable software application. The user may preserve a copy of that data file using cloud computing. Cloud computing allows a service proxy to offload certain functions of a user device to one or more network devices, referred to as the cloud.

A user may access any cloud service provided by the cloud using a cloud user account. The cloud may perform processing and backup storage functions for the user device. The user may store a copy of a data file on a cloud server connected at least intermittently via a network to each device associated with the user. Each time the data file is updated on one user device, the data file may be synchronized with the copy on the cloud server and any other user device with a cloud user account.

A telemetry system may collect data from each endpoint of a cloud to track correctness and performance during a cloud service, such as a cloud synchronization system. A client device may track the synchronization and create a telemetry report to send to a telemetry server. The client device may use file metadata to verify that the synchronization occurred correctly. The client device may also report any assertion failures or synchronization stalls that happen during the synchronization process.

The telemetry server may then use that data to document and diagnose any synchronization errors that occur during the synchronization process. The telemetry server may identify any common errors or error patterns and automatically provide an error patch to correct those errors. The telemetry server may send a review report to the user of the client device or to an administrator of the cloud synchronization system. The review report may organize the telemetry data into a service-wide performance record covering the cloud synchronization system, aggregate user performance records covering different demographic groupings of cloud synchronization system users, and an individual user performance record.

Thus, in one embodiment, a telemetry system may track a cloud synchronization system to improve performance. A service proxy may receive a matching file metadata set for a matching file stored in a cloud user account of a cloud synchronization system. The service proxy may execute a synchronization verification of the matching file metadata set to a local file stored in a client device. The service proxy may create a telemetry report describing a synchronization error as determined by the synchronization verification.

FIG. 1 illustrates, in a block diagram, one embodiment of a cloud synchronization network 100. A client device 110 may store a local file 112, such as a text file, a digital audio file, a digital image file, a digital video file, an application, or other data file. The client device 110 may be a desktop computer, a laptop computer, a handheld computer, a smartphone, or other computing device. The client device 110 may use a service proxy 114 to act as a cloud client interface to subscribe to a cloud service, such as a cloud synchronization system. The service proxy 114 may implement a client synchronization engine 116 to maintain synchronized copies of the local file 112 throughout the cloud synchronization network 100.

The service proxy 114 may use a data network connection 120 to connect to a cloud server 130. The cloud server 130 may store a cloud user account 132 for the user associated with the client device 110. The cloud user account 132 may maintain a matching file 134 for the local file 112 stored on the client device 110. The matching file 134 is a copy of a version of the local file 112 stored on the client device 110. The cloud server 130 may implement a cloud synchronization engine 136 to synchronize the local file 112 with the matching file 134 on a pre-set schedule or each time either the local file 112 or the matching file 134 is updated.

Further, an associated user device 140 may have an associated service proxy 142 acting as an incarnation of the cloud user account 132 maintaining the matching file 134. The associated user device 140 may use an associated synchronization engine 144 to synchronize the matching file 134 with either the matching file 134 on the cloud server 130 or the local file 112 on the client device 110. An associated user device 140 is any device registered with the cloud user account 132. An associated user device 140 may be considered a separate client device 110, and vice versa.

A telemetry server 150 may maintain a telemetry system in the cloud to track the correctness and performance of the cloud synchronization system. The telemetry server 150 may be accessed via the cloud server 130 or may be accessed directly via the data network connection 120. The telemetry server 150 may receive a telemetry report from the client device 110 or the cloud server 130 describing the correctness and performance of a synchronization, including any synchronization errors that may have occurred. The telemetry server 150 may then provide the client device 110 with a review report to be shown to the user to describe the performance of the cloud synchronization system. The telemetry server 150 may maintain a known error database 152 to store common errors or error patterns and the error patches or user actions that may correct those errors.

Figure 2:
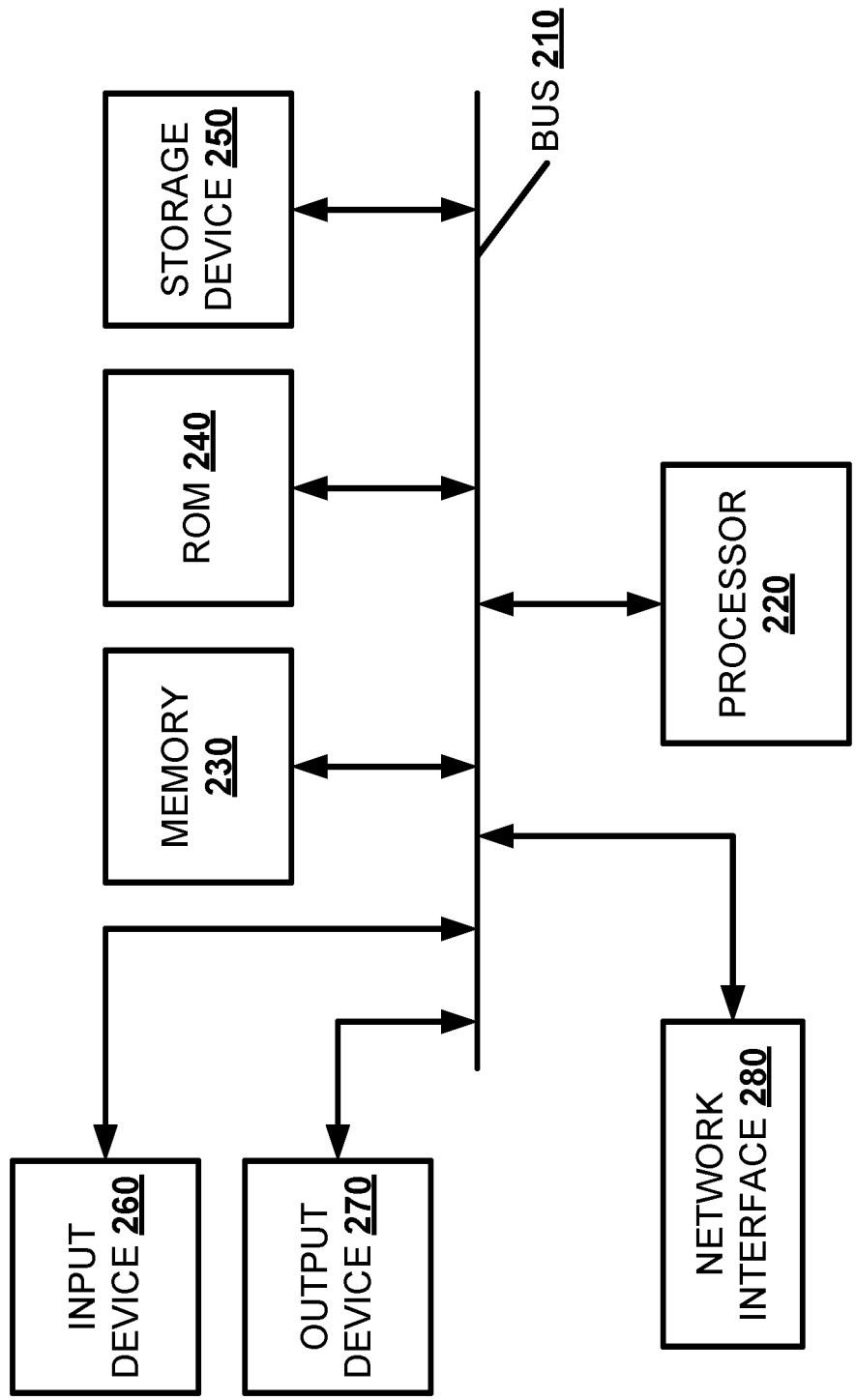
FIG. 2 illustrates, in a block diagram, one embodiment of a computing device.

FIG. 2 illustrates a block diagram of an exemplary computing device 200 which may act as a client device 110, associated user device 140, a cloud server 130, or a telemetry server 150. The computing device 200 may combine one or more of hardware, software, firmware, and system-on-a-chip technology to implement a telemetry system or a cloud synchronization system. The computing device 200 may include a bus 210, a processor 220, a memory 230, a read only memory (ROM) 240, a storage device 250, an input device 260, an output device 270, and a network interface 280. The bus 210, or other inter-component communication system, may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The ROM 240 may include a conventional ROM device or another type of static storage device that stores static information and instructions for the processor 220. The storage device 250 may include any type of tangible machine-readable medium, such as, for example, magnetic or optical recording media and its corresponding drive. A tangible machine-readable medium is a physical medium storing machine-readable code or instructions, as opposed to a transitory medium or signal. The storage device 250 may store a set of instructions detailing a method that when executed by one or more processors cause the one or more processors to perform the method. The storage device 250 may also be a database or a database interface for storing telemetry records.

The input device 260 may include one or more conventional mechanisms that permit a user to input information to the computing device 200, such as a keyboard, a mouse, a voice recognition device, a microphone, a headset, a touch-screen, etc. The output device 270 may include one or more conventional mechanisms that output information to the user, including a display, a printer, one or more speakers, a headset, or a medium, such as a memory, or a magnetic or optical disk and a corresponding disk drive. The network interface 280 may include any transceiver-like mechanism that enables computing device 200 to communicate with other devices or networks. The network interface 280 may be a wireless, wired, or optical interface.

The computing device 200 may perform such functions in response to a processor 220 executing sequences of instructions contained in a computer-readable medium, such as, for example, the memory 230, a magnetic disk, or an optical disk. Such instructions may be read into the memory 230 from another computer-readable medium, such as the storage device 250, or from a separate device via the communication interface 280.

FIG. 3 illustrates, in a block diagram, one embodiment of a matching file metadata set message 300. The matching file metadata set message 300 may have a client device address 302 to indicate the client device 110 to which the matching file metadata set message 300 is being sent. The matching file metadata set message 300 may transmit the matching file metadata set 304 to the client device 110. A matching file metadata set 304 describes the characteristics of the matching file 134. The matching file metadata set 304 may have a file name 306 identifying the matching file 134, a file hierarchy 308 describing the storage location of the matching file 134, the size 310 of the matching file 134, a file hash 312 of the matching file 134, and a timestamp 314 identifying the last time the matching file 134 was modified. The file hash 312 is a value produced by applying a hash function to the contents of the matching file 134. By comparing the file hash 312 of a matching file 134 to the file hash 312 of a local file 112, a processor may determine whether a matching file 134 is the same as a local file 112.

FIG. 4 illustrates, in a block diagram, one embodiment of a telemetry report 400. The telemetry report 400 may have a telemetry server address 402 to indicate the telemetry server 150 to which the telemetry report 400 is being sent. The telemetry report 400 may transmit a telemetry data set 404 to the telemetry server 150. A telemetry data set 404 may describe the performance of a cloud synchronization system during a synchronization. The telemetry data set 404 may contain any number of types of telemetry data.

For example, the telemetry data set 404 may have a user identifier 406 describing the client device 110. The telemetry data set 404 may have a data file description 408 describing the local file 112 or matching file 134, such as the file type and the file originator. The telemetry data set 404 may have a software (SW) description 410 describing the software being used to read the local file 112 or matching file 134, such as the version number or developer.

The telemetry data set 404 may have synchronization error data 412 describing a synchronization error identified by a synchronization verification, along with an event time 414 for that synchronization error. The event time 414 may indicate the time of the synchronization error as determined by the metadata timestamp 314, rather than the time of the synchronization verification.

Assertion failure data 416 in the telemetry data set 404 may describe an assertion failure that has occurred during the synchronization of the local file 112 and the matching file 134, along with any assertion log data 418 taken at the time of the assertion failure. The assertion failure data 416 may report any failed assertions, such as a debug assertion, a retail assertion, a shipping assertion, or other, to the telemetry server 150 for debugging.

Synchronization stall data 420 in the telemetry data set 404 may describe a synchronization stall that has occurred during the synchronization of the local file 112 and the matching file 134, along with any stall log data 422 taken at the time of the synchronization stall. The service proxy 114 may attempt to self-diagnose any failure to progress on synchronization. If, for example, an upload fails from "precondition failed", but a subsequent change enumeration returns an error indicating no modification and no progress made, the service proxy 114 may identify the stall. The service proxy 114 may identify the stall based on no further progress being made until the cloud service allows the upload or returns a reason for a failure to upload.

The telemetry data set 404 may describe a synchronization performance metric 424 tracking the synchronization of the local file 112 and the matching file 134, including if the synchronization is successful. The synchronization performance metric 424 describes the execution of the synchronization, such as the success or failure rate, the synchronization call time, bandwidth use, processor usage on the client device 110, and other metrics. The synchronization performance metric 424 may exclude resources used by the telemetry process.

FIG. 5 illustrates, in a block diagram, one embodiment of a telemetry record 500. The telemetry server 150 may store the telemetry record 500. The telemetry server 150 or an administrator may compare the telemetry record 500 with the telemetry report 400 to identify any new problems. The telemetry record 500 may have a user demographic data set 502 describing the user associated with the cloud user account 132. For example, the user demographic data set 502 may describe the location of the user, the type of files synchronized by the user, and other data about the user and the user's files. The telemetry record 500 may have a device profile 504 describing the client device 110 sending the telemetry report 400. For example, the device profile 504 may describe the type of client device 110, the processing, the connection speed, the memory, or the other characteristics of the client device 110. The telemetry record 500 may associate the user demographic data set 502 and the device profile 504 with the telemetry data set 404.

FIG. 6 illustrates, in a block diagram, one embodiment of a review report 600. The review report 600 may have a client device address 602 to indicate the client device 110 to which the review report 600 is being sent. The review report 600 may transmit a review data set 604 to the client device 110. The review data set 604 may have an error patch 606 for correcting any synchronization error identified in the telemetry report 400.

The review data set 604 may have a service-wide performance record 608, an aggregate user performance record 610, or an individual user performance record 612. The service-wide performance record 608 may track the overall performance of the cloud synchronization system, such as uptime, success rate, and other metrics describing the performance of the cloud synchronization system. Further, the service-wide performance record 608 may track the number of files synchronized correctly by the cloud synchronization system, such as local files 112 with no matching files 134, matching files 134 with no local files 112, local files 112 with a different file size from the matching file 134, local files 112 with a different version from the matching files 134, local files 112 with different timestamps from the matching files 134, and other metrics. The aggregate user performance record 610 may collect groups of users based on demographics and performance trends to show the user groups performance and correctness. The individual user performance record 612 may track the performance and correctness of devices associated with the user of the client device 110, or may be limited to the client device 110. The individual user performance record 612 may be presented as a user customizable timeline 614. The user may customize the user customizable timeline 614 by selecting which metrics to display in timeline form.

Figure 7:
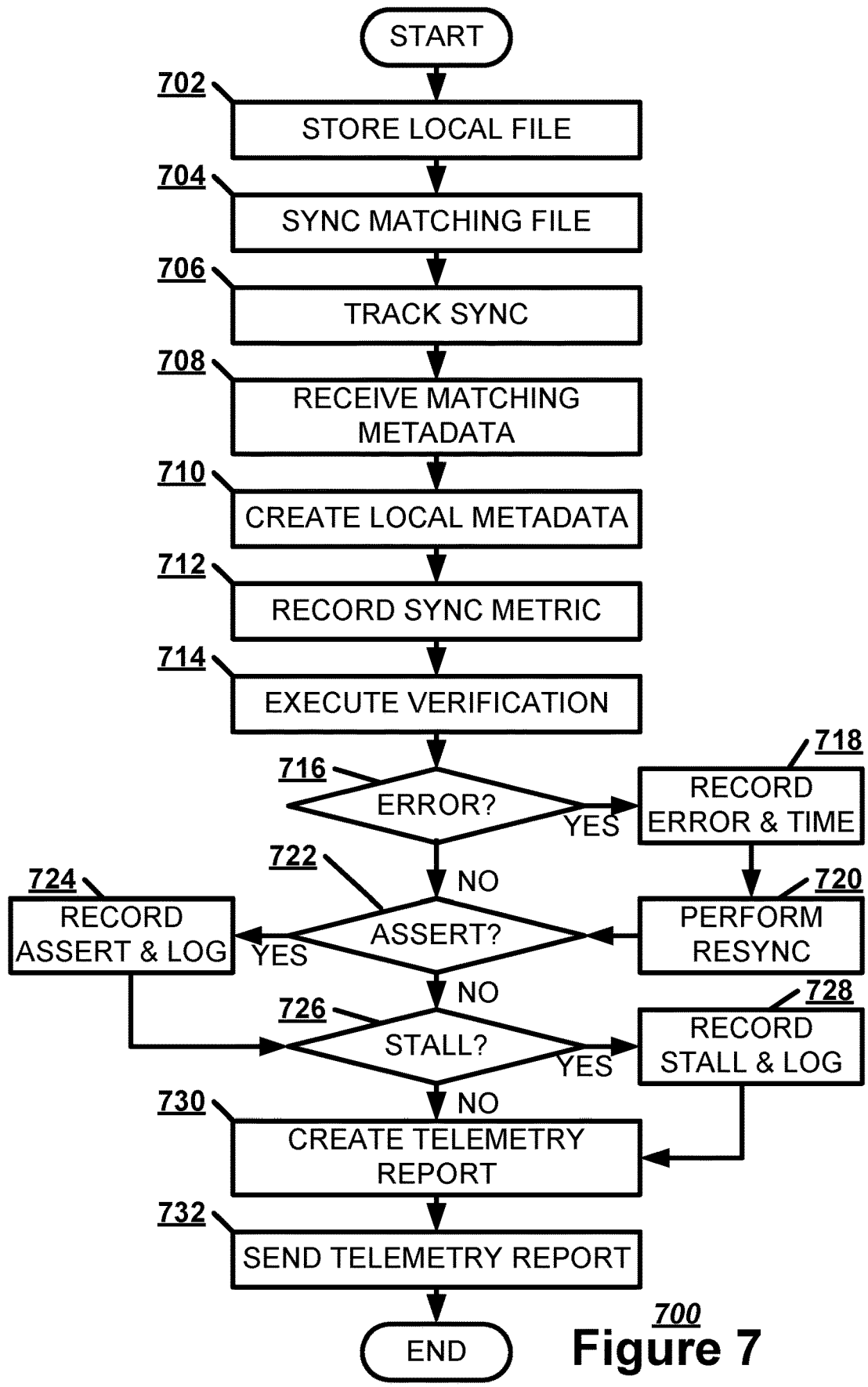
FIG. 7 illustrates, in a flowchart, one embodiment of a method of synchronizing a local file using the client device.

FIG. 7 illustrates, in a flowchart, one embodiment of a method 700 of synchronizing a local file 112 using the client device 110. The service proxy 114 may store the local file 112 on the client device 110 (Block 702). The service proxy 114 may synchronize the local file 112 with a matching file 134 stored in a cloud user account 132 of a cloud synchronization system (Block 704). The service proxy 114 may track a synchronization of the local file 112 and the matching file 134 to record a synchronization performance metric 424 for a telemetry report 400 (Block 706). The service proxy 114 may receive a matching file metadata set 304 for a matching file 134 stored in a cloud user account 132 of a cloud synchronization system from at least one of a cloud server 130 or an associated user device 140 (Block 708). The service proxy 114 may create a local file metadata set to compare with the matching file metadata set 304 for a synchronization verification (Block 710).

The service proxy 114 may record a synchronization performance metric 424 for a telemetry report 400 (Block 712). The service proxy 114 may execute a synchronization verification of the matching file metadata set 304 to a local file 112 stored in the client device 110 upon completion of the synchronization between the local file 112 and the matching file 134 (Block 714). If the synchronization verification determines that a synchronization error has occurred (Block 716), the service proxy 114 may record a synchronization error data 412 and an event time 414 for the telemetry report 400 (Block 718). The service proxy 114 may perform a resynchronization of the local file 112 to the matching file 134 (Block 720). If the service proxy 114 receives an assertion failure during the synchronization of the local file 112 and the matching file 134 (Block 722), the service proxy 114 may record the assertion failure 416 and an assertion log data set 418 for the telemetry report 400

(Block 724). If the service proxy 114 recognizes a synchronization stall during a synchronization of the local file 112 and the matching file 134 (Block 726), the service proxy 114 may record the synchronization stall 420 and a stall log data set 422 for the telemetry report 400 (Block 728). The service proxy 114 may create a telemetry report 400 to describe the synchronization performance, a synchronization error 412 and event time 414 as determined by the synchronization verification, an assertion failure 416 and an assertion log data set 418, and a synchronization stall 420 and a stall log data set 422 (Block 730). The service proxy 114 may send the telemetry report 400 to the telemetry server 150 (Block 732).

Figure 8:
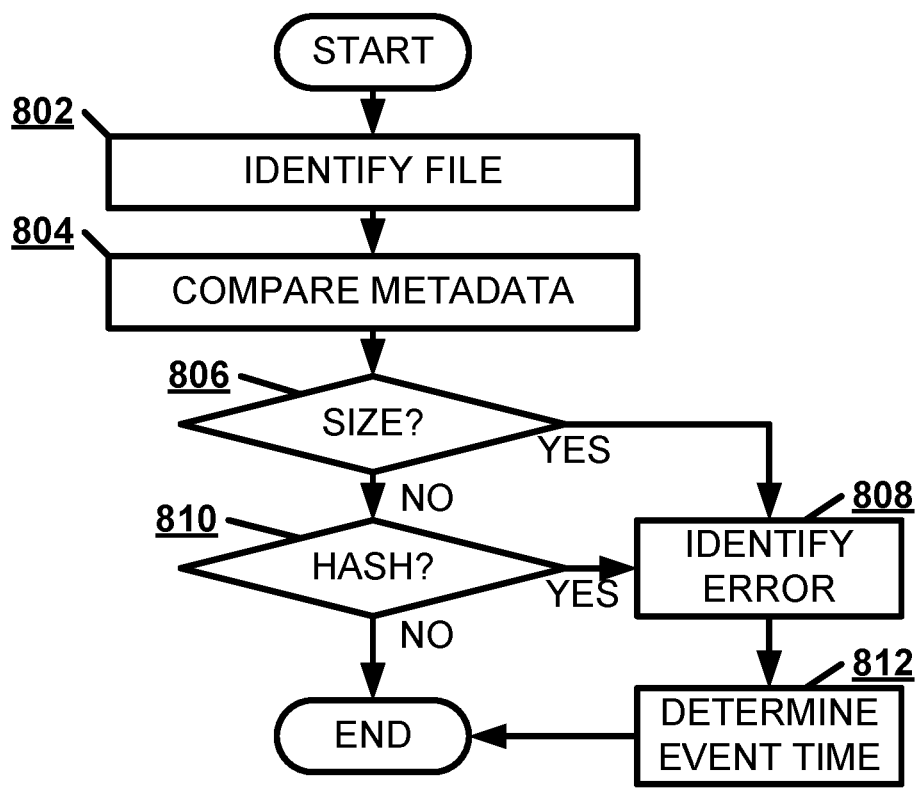
FIG. 8 illustrates, in a flowchart, one embodiment of a method of executing a synchronization verification.

FIG. 8 illustrates, in a flowchart, one embodiment of a method 800 of executing a synchronization verification. The service proxy 114 may identify a local file 112 that corresponds to the matching file 134 using the file name 306 and the file hierarchy 308 (Block 802). The service proxy 114 may compare the matching file metadata set 304 to the local file metadata set (Block 804). If the size 310 of the matching file metadata set 304 differs from the size of the local file metadata set (Block 806), the service proxy 114 may identify a synchronization error (Block 808). If the file hash 312 of the matching file metadata set 304 differs from the file hash of the local file metadata set (Block 810), the service proxy 114 may identify a synchronization error (Block 808). The service proxy 114 may determine from the time stamp 314 of the matching file metadata set an event time for the synchronization error (Block 812).

Figure 9:
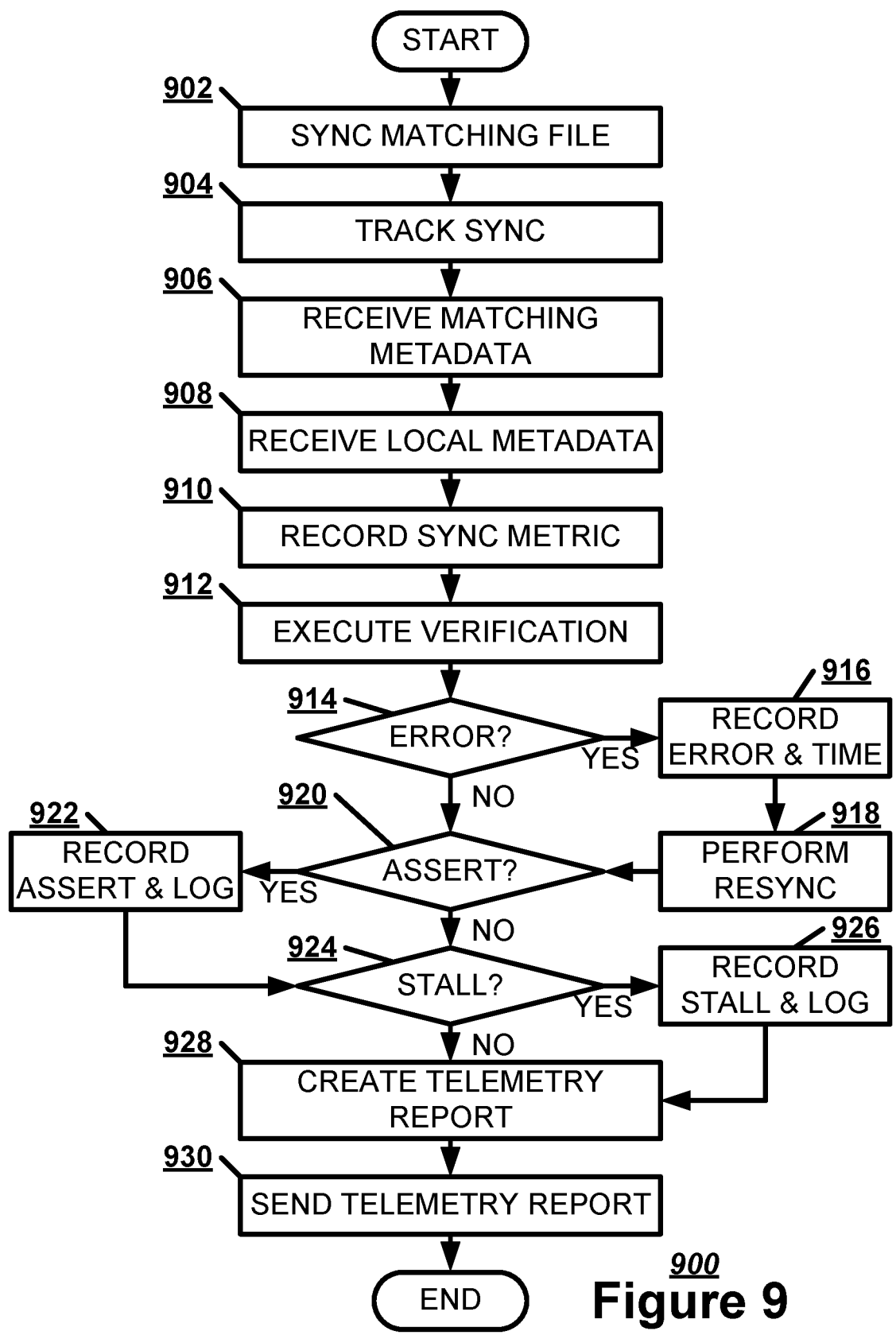
FIG. 9 illustrates, in a flowchart, one embodiment of a method of synchronizing a matching file using the cloud server.

Many of the telemetry functions performed by the client device 110 may be performed by the cloud server 130. FIG. 9 illustrates, in a flowchart, one embodiment of a method 900 of synchronizing a matching file using the cloud server. The cloud server 130 may synchronize the local file 112 stored at the client device 110 with a matching file 134 stored in a cloud user account 132 of a cloud synchronization system (Block 902). The cloud server 130 may track a synchronization of the local file 112 and the matching file 134 (Block 904). The cloud server 130 may receive a matching file metadata set 304 for a matching file 134 stored in a cloud user account 132 of a cloud synchronization system (Block 906). The cloud server 130 may receive a local file metadata set to compare with the matching file metadata set 304 for a synchronization verification (Block 908).

The cloud server 130 may record a synchronization performance metric 424 to the telemetry report 400 (Block 910). The cloud server 130 may execute a synchronization verification of the matching file metadata set 304 to a local file 112 stored in the client device 110 (Block 912). If the synchronization verification determines that a synchronization error has occurred (Block 914), the cloud server 130 may record a synchronization error data 412 and an event time 414 for the telemetry report 400 (Block 916). The cloud server 130 may perform a resynchronization of the local file 112 to the matching file 134 (Block 918). If the cloud server 130 receives an assertion failure during the synchronization of the local file 112 and the matching file 134 (Block 920), the cloud server 130 may record the assertion failure 416 and an assertion log data set 418 to the telemetry report 400 (Block 922). If the cloud server 130 recognizes a synchronization stall during a synchronization of the local file 112 and the matching file 134 (Block 924), the cloud server 130 may record a synchronization stall 420 and a stall log data set 422 to the telemetry report 400 (Block 926). The cloud server 130 may create a telemetry report 400 to describe the synchronization performance, a synchronization error 412 and event time 414 as determined by the synchronization verification, an assertion failure 416 and an assertion log data set 418, and a synchronization stall 420 and a stall log data set 422 (Block 928). The cloud server 130 may send the telemetry report 400 to the telemetry server 150 (Block 930).

FIG. 10 illustrates, in a flowchart, one embodiment of a method 1000 of processing a telemetry report in a telemetry server 150. The telemetry server 150 may receive from a client device 110 a telemetry report 400 having a telemetry data set 404 compiled at the client device 110 describing a cloud service associated with a cloud user account 132 for the user (Block 1002). The telemetry server 150 may associate the telemetry data set 404 with a user demographic data set 502 for the cloud user account 132 (Block 1004). The telemetry server 150 may associate the telemetry data set 404 with a device profile 504 for the client device 110 (Block 1006).

The telemetry server 150 may compare a synchronization error in the telemetry report 600 to a known error database 152 to find a matching error (Block 1008). If the known error database 152 produces a matching error (Block 1010), the telemetry server 150 may select an error patch 606 for the review report 600 based on the matching error (Block 1012). The telemetry server 150 may send an updated review report 600 if an error patch 606 is created after the fact. The telemetry server 150 may collect a service-wide performance record 608 for the review report 600 (Block 1014). The telemetry server 150 may collect an aggregate user performance record 610 for the review report 600 (Block 1016). The telemetry server 150 may collect an individual user performance record 612 for the review report 600 (Block 1018). The telemetry server 150 may create a user customizable timeline 614 based on the individual user performance record 612 (Block 1020). The telemetry server 150 may create a review report 600 based in part on the telemetry data set 404 (Block 1022). The review report 600 may have the service-wide performance record 608, an aggregate user performance record 610, an individual user performance record 612, or a user customizable timeline 614. The telemetry server 150 may send the review report 600 to the client device 110 (Block 1024).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

The invention claimed is:

1. A machine-implemented method, comprising:
   in a synchronization process, sending a local file to a server for synchronization with a matching file;
   receiving a matching file metadata set describing a matching characteristic of the matching file after synchronization of the local file and the matching file by the server, the matching file metadata set comprising metadata for the matching file and a timestamp identifying a last modification time for the matching file;
   generating a local file metadata set comprising metadata for the local file;
   executing a synchronization verification after synchronization of the local file and the matching file by the server by comparing the metadata for the matching file to the metadata for the local file to determine one or more of a performance and/or a correctness of the synchronization of the local file with the matching file at the server;
   creating a telemetry report describing the synchronization after comparing the metadata for the matching file to the metadata for the local file in the synchronization verification, the telemetry report including information regarding the one or more of the performance and/or the correctness of the synchronization as determined by the synchronization verification;
   sending the telemetry report describing the synchronization to a telemetry server;
   receiving a review report based upon the telemetry report describing the synchronization from the telemetry server, the review report comprising an error patch for correcting a synchronization error identified in the telemetry report; and
   correcting the synchronization error using the error patch.

2. The machine-implemented method of claim 1, wherein the review report comprises at least one of an individual user performance record and an aggregate user performance record.

3. The machine-implemented method of claim 1, wherein the telemetry report further comprises a one or more of a user identifier describing a client device, a data file description describing the local file and/or the matching file, and/or a software description describing software being used to read one or more of the local file and/or the matching file.

4. The machine-implemented method of claim 1, wherein creating the telemetry report comprises including in the telemetry report synchronization error data describing a synchronization error as determined by the synchronization verification, and including an event time for the synchronization error.

5. The machine-implemented method of claim 1, further comprising:
   after receiving the review report from the telemetry server,
   presenting a user customizable timeline based on an individual user performance record in the review report.

6. The machine-implemented method of claim 1, further comprising:
   performing a resynchronization of the local file to the matching file.

7. The machine-implemented method of claim 1, further comprising:
   receiving an assertion failure during the synchronization of the local file and the matching file,
   wherein creating the telemetry report comprises describing the assertion failure.

8. The machine-implemented method of claim 1, further comprising:
   recognizing a synchronization stall during the synchronization of the local file and the matching file,
   wherein creating the telemetry report comprises describing the synchronization stall.

9. A client device, comprising:
   a hardware data storage configured to store a local file and a local file metadata set for the local file, the local file metadata set including a timestamp identifying a last modification time for the local file;
   a processor configured to
      in a synchronization process, send the local file to a server for synchronization with a matching file;
      execute a synchronization verification after synchronization of the local file and the matching file by the server by comparing a received matching file metadata set for the matching file to the local file metadata set for the local file to determine one or more of a performance and/or a correctness of the synchronization process of the local file with the matching file at the server; and
      create a telemetry report describing the synchronization process after comparing the metadata for the matching file to the metadata for the local file in the synchronization verification, the telemetry report including information regarding the one or more of the performance and/or the correctness of the synchronization process as determined by the synchronization verification; and
   a hardware network interface configured to receive the matching file and send the telemetry report to a telemetry server, and to receive from the telemetry server a review report based upon the telemetry report describing the synchronization, the review report comprising an error patch for correcting a synchronization error identified in the telemetry report, wherein the processor is further configured to correct the synchronization error using the error patch.

* * * * *